United States Patent
Kiwak et al.

(10) Patent No.: US 7,506,709 B2
(45) Date of Patent: Mar. 24, 2009

(54) PERSONAL MOBILITY VEHICLE SUSPENSION SYSTEM HAVING A COMPENSATION MECHANISM

(75) Inventors: Frederick Kiwak, 301 Mountain View Way, Scranton, PA (US) 18508; Jonathan Jaffe, 180 William Feather Dr., Voorhees, NJ (US) 08043; Chris McConnell, 432 Bridge St., Old Forge, PA (US) 18518

(73) Assignees: Frederick Kiwak, Scranton, PA (US); Jonathan Jaffe, Voorhees, NJ (US); Chris McConnell, Old Forge, PA (US)

( * ) Notice: Subject to any disclaimer, the term of this patent is extended or adjusted under 35 U.S.C. 154(b) by 490 days.

(21) Appl. No.: 11/256,706

(22) Filed: Oct. 24, 2005

(65) Prior Publication Data

US 2006/0097475 A1 May 11, 2006

Related U.S. Application Data

(60) Provisional application No. 60/621,224, filed on Oct. 22, 2004.

(51) Int. Cl.
 *B60K 1/00* (2006.01)
(52) U.S. Cl. ............... 180/65.1; 180/907; 280/124.1; 280/304.1
(58) Field of Classification Search ............. 180/65.1, 180/65.5, 907, 24, 59, 60, 24.02, 24.03, 24.07, 180/8.2; 280/124.1, 5.2, 5.28, 755, 767, 280/647, 47.16, 304.1
See application file for complete search history.

(56) References Cited

U.S. PATENT DOCUMENTS

| | | |
|---|---|---|
| 2,264,023 A | 11/1941 | Farber |
| 2,371,864 A | 3/1945 | Woolson et al. |
| 4,128,137 A | 12/1978 | Booth |
| 4,245,847 A | 1/1981 | Knott |
| 4,310,167 A | 1/1982 | McLaurin |
| 5,435,404 A | 7/1995 | Garin, III |
| 5,556,121 A | 9/1996 | Pillot |
| 5,575,348 A | 11/1996 | Goertzen et al. |
| 5,772,237 A | 6/1998 | Finch et al. |
| D397,645 S | 9/1998 | Schaffner |
| 5,848,658 A | 12/1998 | Pulver |
| 5,851,019 A | 12/1998 | Gill et al. |
| 5,853,059 A | 12/1998 | Goertzen et al. |
| D404,693 S | 1/1999 | Schaffner |

(Continued)

*Primary Examiner*—Christopher P Ellis
*Assistant Examiner*—John D Walters
(74) *Attorney, Agent, or Firm*—Volpe and Koenig PC

(57) ABSTRACT

A personal mobility vehicle (PMV) is provided having suspension assemblies located on lateral sides thereof. The suspension assemblies each include a main pivot arm having first and second main-arm-ends, an intermediate portion, and a first wheel connected to the first main-arm-end. The intermediate portion is pivotally connected to one of the lateral sides, with the first main-arm-end and first wheel extending in a first direction from the vehicle frame. A center drive wheel is located on the second main-arm-end of the main pivot arm. A wheel support arm having first and second support-arm-ends and a second wheel connected to the second support arm end is pivotally connected to one of the lateral sides. The first support-arm-end is slidably engaged with the main pivot arm, and the second support-arm-end and the second wheel extend in a second direction, generally opposite the first direction.

24 Claims, 7 Drawing Sheets

U.S. PATENT DOCUMENTS

| | | |
|---|---|---|
| 5,944,131 A | 8/1999 | Schaffner et al. |
| 5,964,473 A | 10/1999 | Degonda et al. |
| 6,047,979 A | 4/2000 | Kraft et al. |
| 6,129,165 A | 10/2000 | Schaffner et al. |
| 6,176,335 B1 | 1/2001 | Schaffner et al. |
| 6,186,252 B1 | 2/2001 | Schaffner et al. |
| 6,199,647 B1 | 3/2001 | Schaffner et al. |
| 6,234,507 B1 | 5/2001 | Dickie et al. |
| 6,341,657 B1 | 1/2002 | Hopely, Jr. et al. |
| 6,412,804 B1 | 7/2002 | Dignat |
| 6,454,286 B1 | 9/2002 | Hosino |
| 6,460,641 B1 | 10/2002 | Kral |
| 6,533,306 B2 | 3/2003 | Watkins |
| 6,543,798 B2 | 4/2003 | Schaffner et al. |
| 6,554,086 B1 | 4/2003 | Goertzen et al. |
| 7,040,429 B2 * | 5/2006 | Molnar ........................ 180/65.1 |
| 7,175,193 B2 * | 2/2007 | Wu ........................... 280/304.1 |
| 7,264,272 B2 * | 9/2007 | Mulhern et al. ............. 280/755 |
| 7,374,002 B2 * | 5/2008 | Fought ....................... 180/65.5 |
| 2001/0011613 A1 | 8/2001 | Schaffner et al. |
| 2002/0030343 A1 | 3/2002 | Schaffner et al. |

* cited by examiner

PERSONAL MOBILITY VEHICLE SUSPENSION SYSTEM HAVING A COMPENSATION MECHANISM

CROSS REFERENCE TO RELATED APPLICATION

This application claims the benefit of U.S. Provisional Application No. 60/621,224, filed Oct. 22, 2004, which is incorporated by reference as if fully set forth.

BACKGROUND

The present invention is generally directed to personal mobility vehicle suspension systems and, more specifically, to a personal mobility vehicle suspension system that compensates for irregularities in a surface during travel thereover by the personal mobility vehicle.

Personal mobility vehicles (PMVs) typically provide mobility for persons having a limited ability to walk or who are completely unable to walk on their own. Such PMVs typically include a relatively sturdy frame supported on wheels with at least one motor for powered movement. A seat is mounted on the frame, and user controls are conveniently located on the personal mobility vehicle within easy reach of the user to regulate operation.

One of the problems associated with conventional PMVs is that there is a tendency to jar a user and tip backwards or forwards when irregularities in a surface are encountered, or when negotiating steeply inclined ramps or other surfaces. Various suspension mechanisms have been developed to increase vehicle stability and to reduce vibrations transmitted to a user. However, such systems still tend to have a relatively rough ride (i.e., tend to transmit a high amount of vibration to a user, and to cause a rocking and tippy ride) when traveling over irregularities. This results in such suspension systems requiring frequent recalibration, repair, spring replacement, and/or replacement of other worn parts.

It would be advantageous to provide a PMV having a suspension system that compensates for irregularities to allow generally smooth traversing of ground surface obstacles encountered by the PMV, and which specifically provides greater wheel contact with the ground surface, for enhanced stability. It is also preferable that such a suspension be relatively durable and sturdy.

SUMMARY

Briefly stated, the present invention is directed to a personal mobility vehicle (PMV) including a vehicle frame having spaced apart lateral sides, with suspension assemblies located on each of the lateral sides. Each suspension assembly includes a main pivot arm having first and second main-arm-ends, an intermediate portion, and a first wheel connected to the first main-arm-end. The intermediate portion is pivotally connected to a respective one of the lateral sides, with the first main-arm-end and first wheel extending in a first direction from the vehicle frame. A center drive wheel is located on the second main-arm-end of the main pivot arm for generally vertical movement relative to the vehicle frame. A wheel support arm is provided having first and second support-arm-ends and a second wheel connected to the second support arm end. The wheel support arm is pivotally connected to the respective one of the lateral sides, and the first support-arm-end is slideably engaged with the main pivot arm. The second support-arm-end and the second wheel extend in a second direction, generally opposite the first direction, from the vehicle frame.

In another aspect, the present invention is directed to a PMV including a vehicle frame having spaced apart lateral sides. Suspension assemblies connected to the frame each include a main pivot arm having a main-arm-pivot-point located at an intermediate position between first and second main-arm-ends. The main-arm-pivot-point is pivotally connected to a respective one of the lateral sides of the vehicle frame. The first main-arm-end extends generally rearwardly from the vehicle frame and is connected to a rear caster wheel having a rear-wheel-axis-of-rotation. A first distance is defined between the main-arm-pivot-point and the rear-wheel-axis-of-rotation. A center drive wheel is located on the second end of the main pivot arm for generally vertical movement relative to the vehicle frame. A front wheel support arm has a support-arm-pivot-point located at an intermediate position between first and second support-arm-ends. The support-arm-pivot-point is pivotally attached to the respective lateral side of the vehicle frame. A connector located on the first support-arm-end is slideably connected with the main pivot arm. A second distance is defined between the support-arm-pivot-point and the connector. The second support-arm-end of the front wheel support arm extends generally forwardly from the vehicle frame and is connected to a front caster wheel having a front-wheel-axis-of-rotation. A third distance is defined between the support-arm-pivot-point and the front-wheel-axis-of-rotation.

BRIEF DESCRIPTION OF THE DRAWINGS

The foregoing summary, as well as the following detailed description of the preferred embodiments of the present invention, will be better understood when read in conjunction with the appended drawings. For the purpose of illustrating the invention, there are shown in the drawings embodiments which are presently preferred. It is understood, however, that the invention is not limited to the precise arrangements and instrumentalities shown. In the drawings.

DETAILED DESCRIPTION OF THE PREFERRED EMBODIMENT(S)

Figure 1:
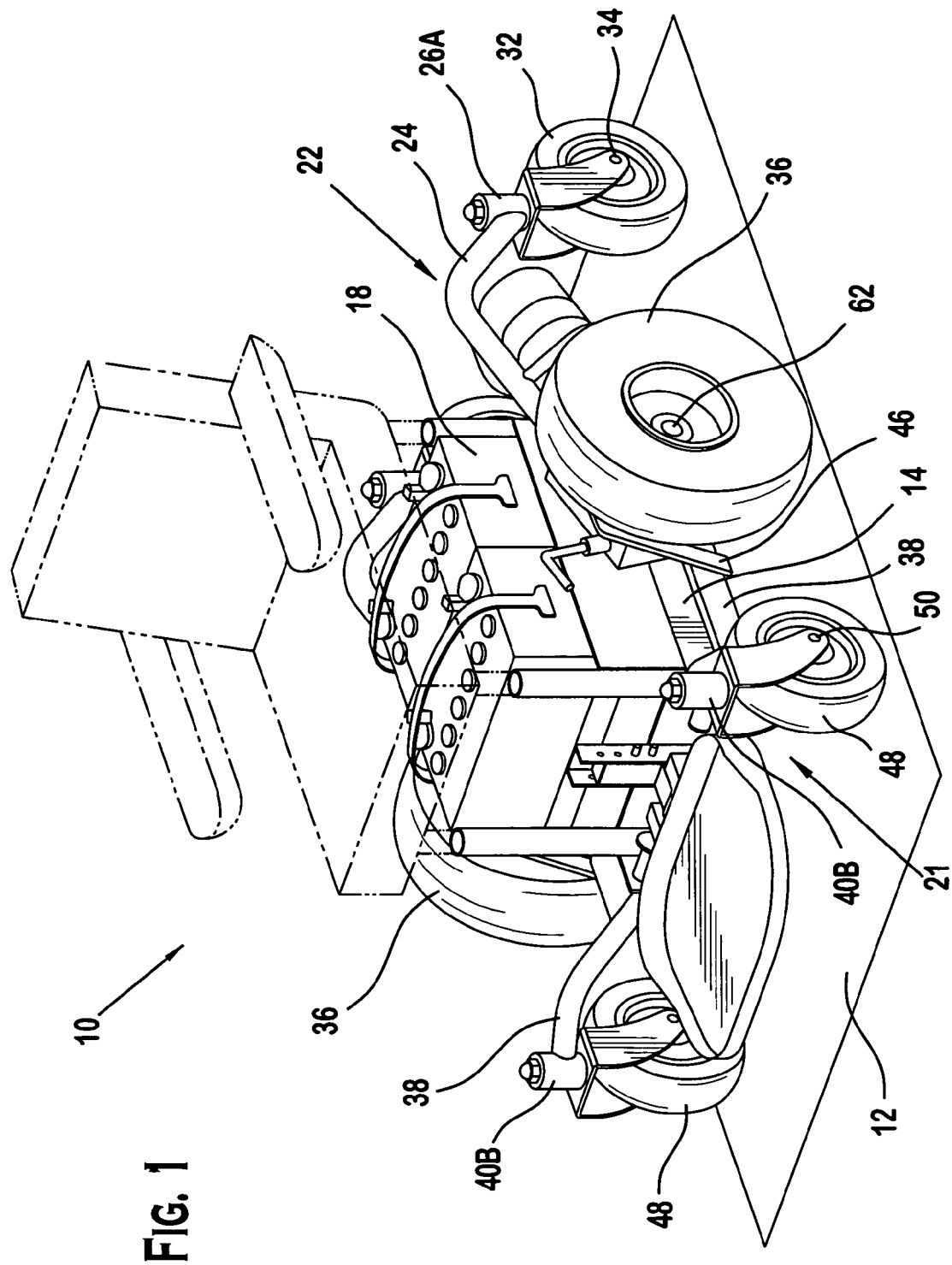
FIG. 1 is a perspective view of a PMV according to a first preferred embodiment of the present invention with its seat and associated controls removed; The center drive wheel and the front and rear caster wheels are shown in a positioned in which they would engage a common flat surface, with the vehicle traveling in a forward direction.

Certain terminology is used in the following description for convenience only and is not limiting. The words "right," "left," "top," and "bottom" designate directions in the drawings to which reference is made. The words "inwardly" and "outwardly" refer to directions toward and away from, respectively, the geometric center of the PMV and designated parts thereof. The word "caster wheel" means "any secondary wheel, anti-tip wheel, roller, anti-tip roller, or conventional wheel typically used with wheel chairs, other transport vehicles, or the like." The words "a" and "one" are defined as including one or more of the referenced item unless specifically stated otherwise. This terminology includes the words above specifically mentioned, derivatives thereof, and words of similar import. The phrase "at least one" followed by a list of two or more items, such as A, B, or C, means any individual one of A, B or C as well as any combination thereof.

Referring to FIGS. 1-7, wherein like numerals indicate like elements throughout, two embodiments of a PMV are shown and are generally designated 10 and 110, respectively. Briefly stated, the PMVs 10, 110 provide a sturdy suspension system 22 capable of compensating for surface irregularities while adjusting a center of gravity of a user to maintain user comfort and balance.

It is preferred that the various components of the suspension system 22 are formed of a durable, strong material, such as steel. Alternatively, those of ordinary skill in the art will appreciate that other structural materials, such as aluminum, stainless steel, suitable polymers, advanced composites or the like, can be used without departing from the scope of the present invention. The wheels of the PMVs 10, 110 can be of any known suitable type.

Referring to FIG. 1, the PMV 10 is configured to support a person in a seated position for transport over a surface 12. The PMV 10 includes a vehicle frame 14 configured to support a seat for a user generally centrally thereon. The frame 14 includes lateral sides 16, best shown in FIG. 4, and is preferably formed by four L-shaped angle irons secured together to form a rectilinear vehicle frame 14. The vehicle frame 14 preferably forms a support for at least one battery 18 to be located thereon to supply power to a wheel motor 20 (further described below). While the seat and the associated seat support members are only shown in phantom lines in FIG. 1 for the sake of clarity of the remaining structure, those of ordinary skill in the art will appreciate that any suitable seat structure can be used with the PMV 10 without departing from the present invention.

Figure 4:
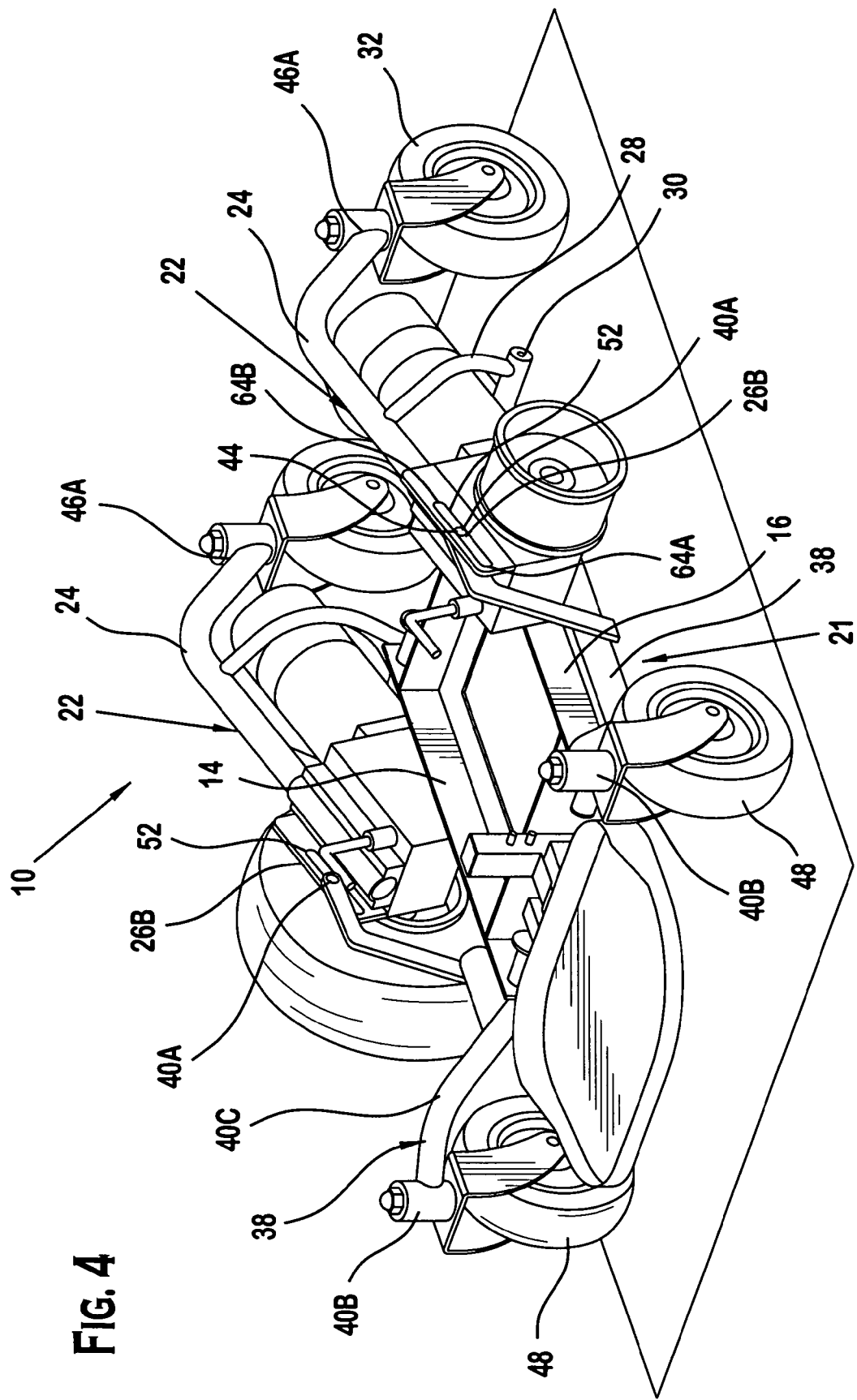
FIG. 4 is a perspective view of the PMV of FIG. 1 with a center drive wheel and other components removed which more clearly shows the connections between a vehicle frame, a main pivot arm, and a front wheel support arm.
Figure 5:
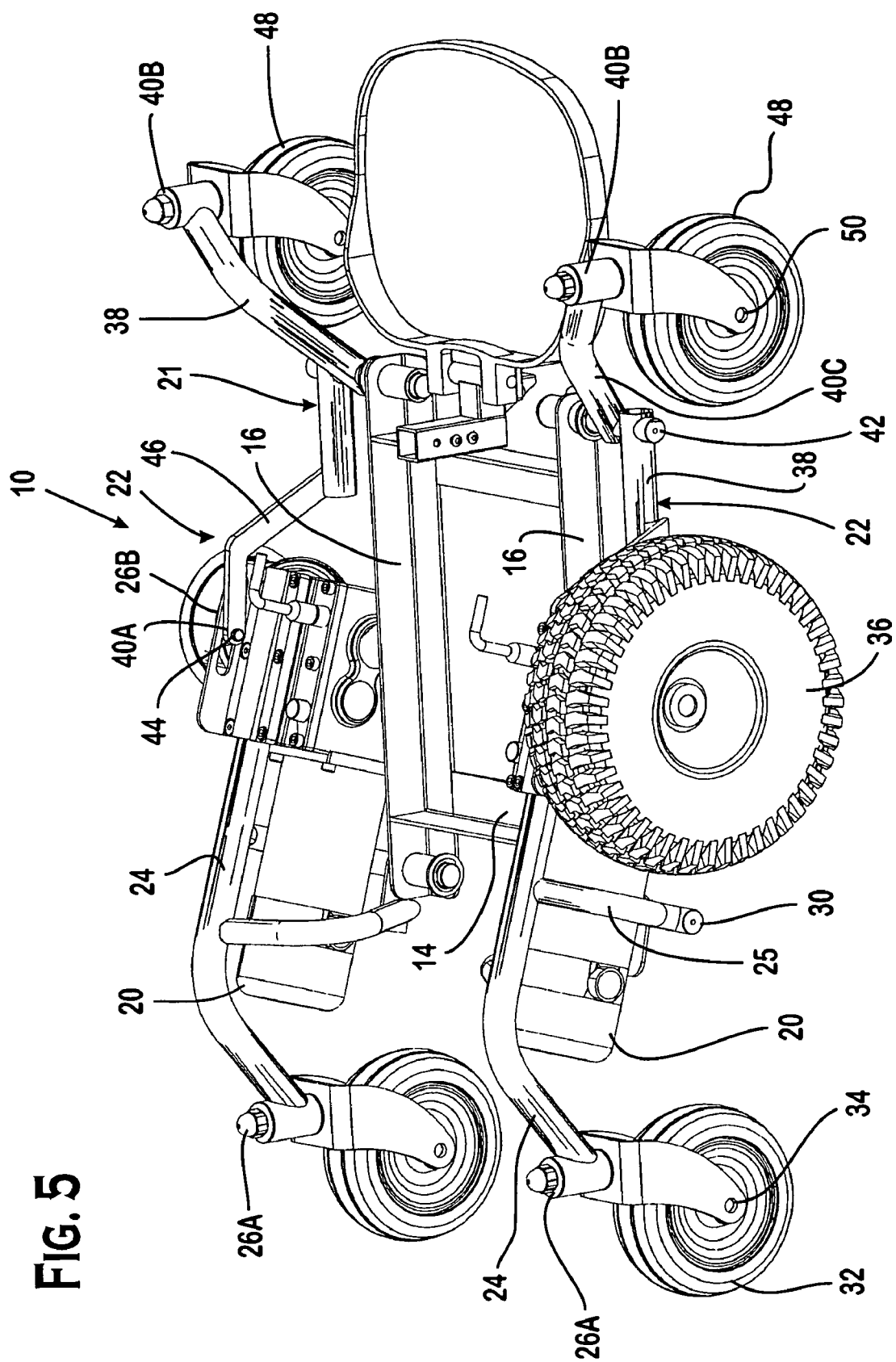
FIG. 5 is a perspective view of the PMV of FIG. 1 from above the PMV.
Figure 6:
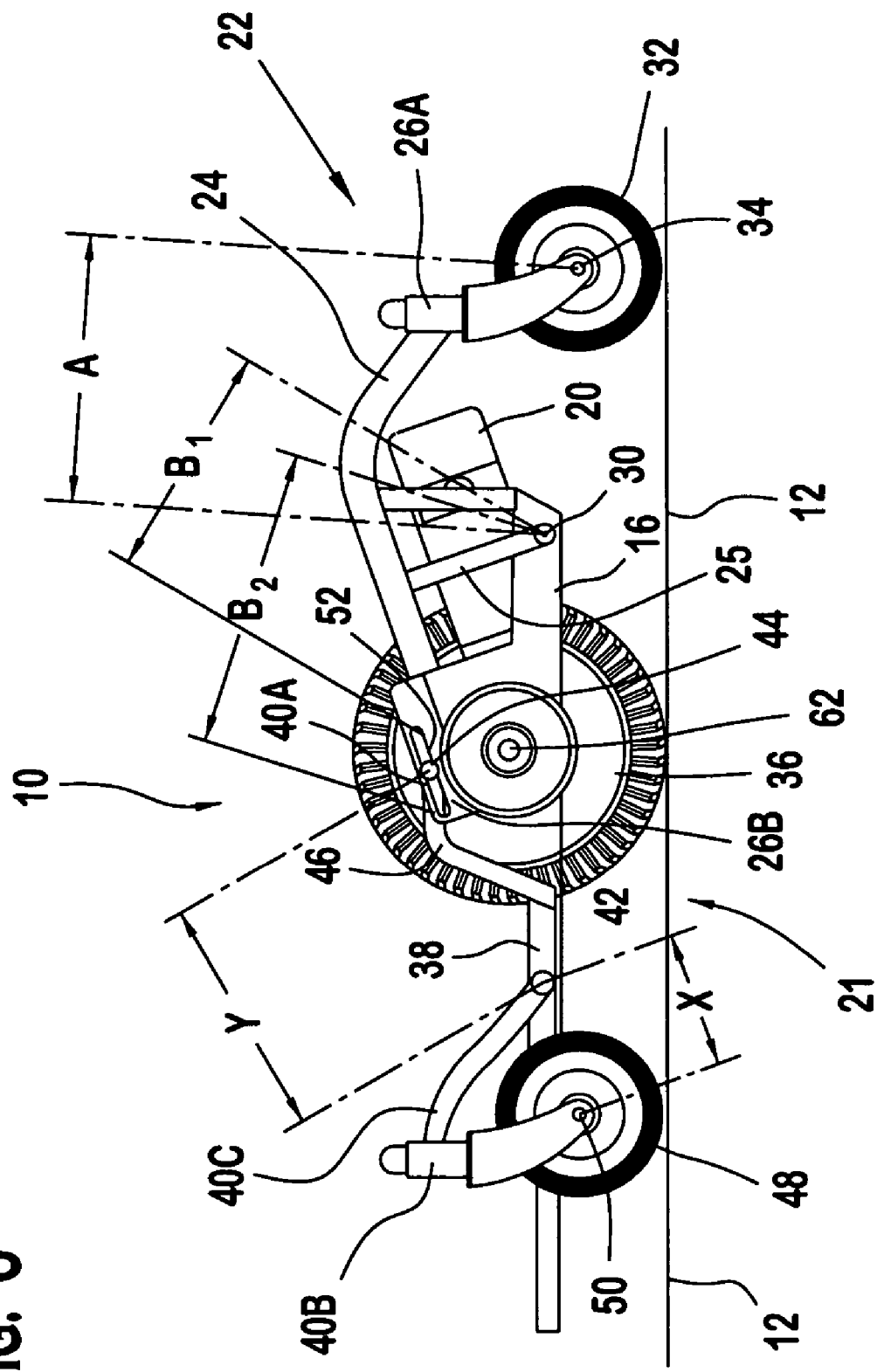
FIG. 6 is a right side elevational view of the PMV of FIG. 1 illustrating various distances defined between components of the suspension system.

Referring to FIGS. 4, 5, and 6 the PMV 10 includes a suspension system 21 that is formed by suspension assemblies 22 located on each of the lateral sides 16 of the vehicle frame 14. Each suspension assembly 22 includes a main pivot arm 24 having first and second main-arm-ends 26A, 26B, respectively, and an intermediate portion 28. As best shown in FIG. 6, the main pivot arm 24 has a main-arm-pivot-point 30 located in an intermediate position between the first and second main-arm-ends 26A, 26B. The main-arm-pivot-point 30 of each assembly is pivotally connected to a respective lateral side 16. The main pivot arm 24 is preferably formed as a welded tube assembly, in which the first and second ends 26A, 26B are on opposite ends of a main tube, and the pivot point 30 is located on a second tube 25 welded to the main tube of pivot arm 24. This provides the required structural rigidity at a relatively low weight. However, the main pivot arm could be formed in any desired manner, such as from bar or plate stock, and it is not required to be formed from tubes.

The first-main-arm-end 26A extends generally rearwardly from the vehicle frame 14 to support a rear caster wheel 32. The rear caster wheel 32 has a rear-wheel-axis-of-rotation 34. Referring still to FIG. 6, a first distance A is defined between the main-arm-pivot-point 30 and the rear-wheel-axis-of-rotation 34. The first distance A is used below to describe the configuration of the suspension system 21.

Figure 2:
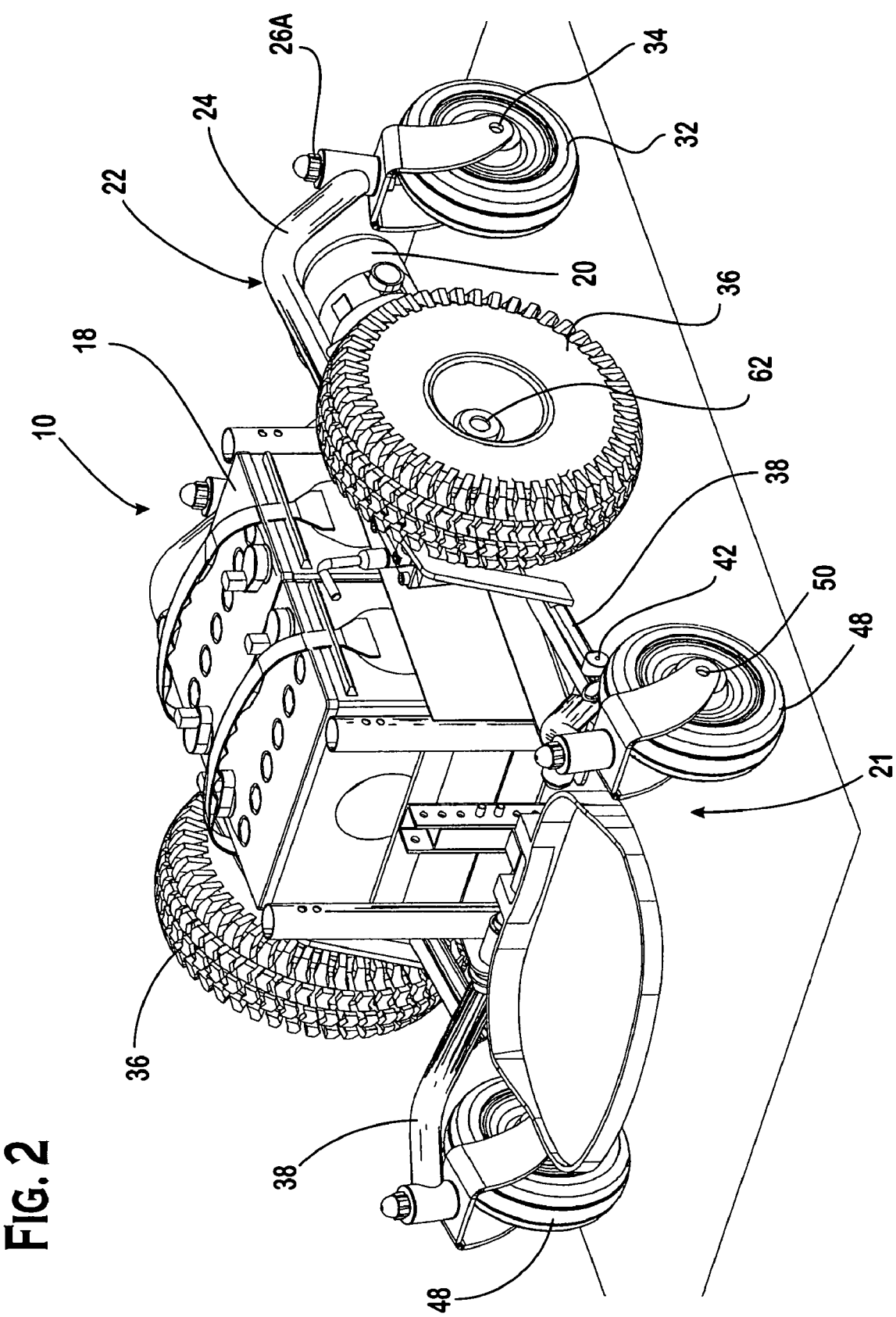
FIG. 2 is a second perspective view of the PMV of FIG. 1 illustrating the suspension system compensating for an irregularity with the front and rear caster wheels displaced generally downwardly relative to the center drive wheel.
Figure 3:
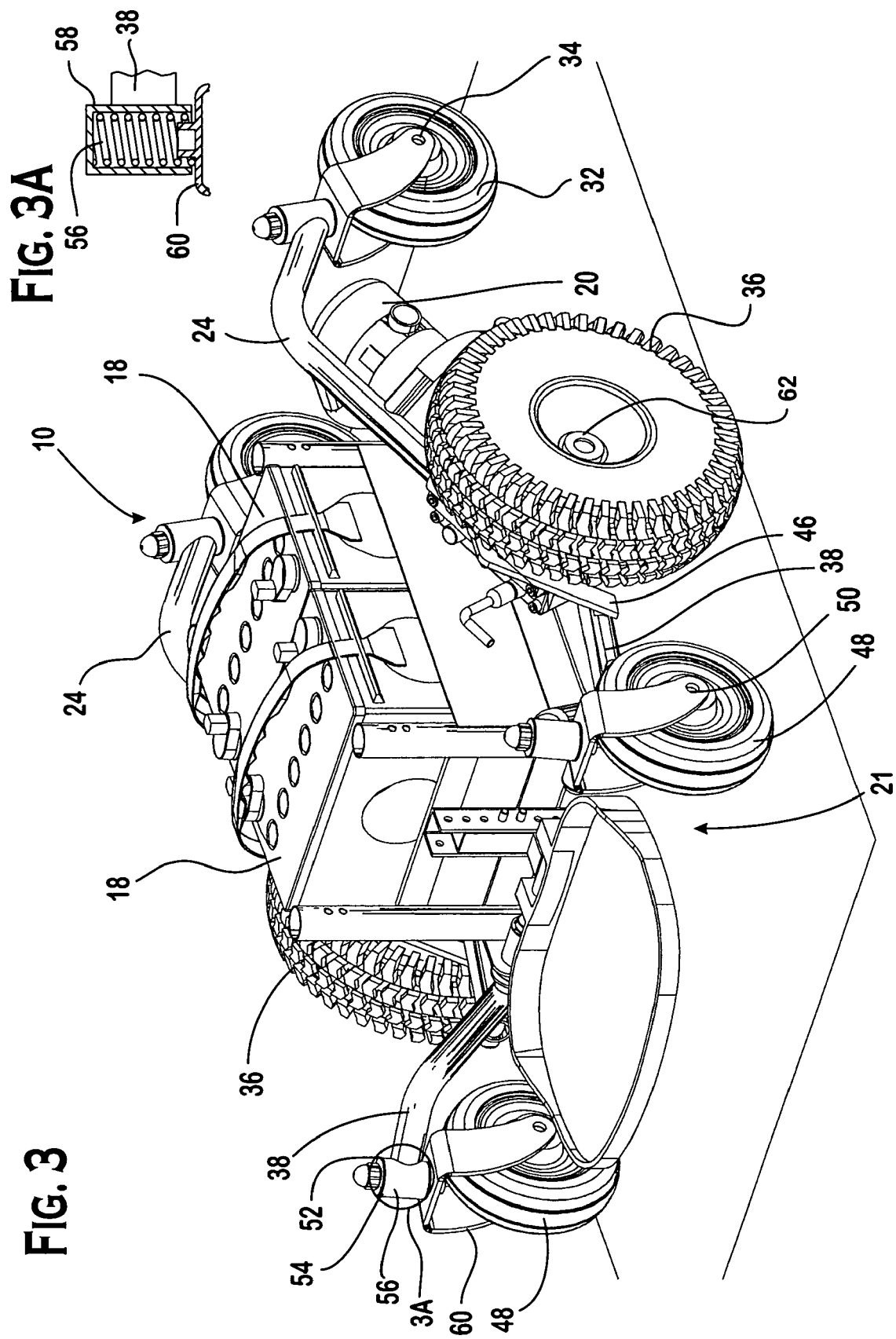
FIG. 3 is a third perspective view of the PMV of FIG. 1 illustrating the suspension system compensating for an irregularity with the front and rear caster wheels displaced generally upwardly relative to the center drive wheel.

As shown in FIGS. 1-3, a center drive wheel 36 is located on the second main-arm-end 26B of the main pivot arm 24 so that the center drive wheel 36 is generally vertically moveable relative to the vehicle frame 14. The term "generally vertically movable" as used to describe the motion of the center drive wheel 36 which includes arcuate upward or downward movement about the generally horizontally offset pivot point 30 as shown in FIG. 6. Such arcuate upward or downward movement results from the pivotal connection of the main pivot arm 24 to the vehicle frame 14. The main pivot arm 24 supports the center drive wheel 36 in a spaced apart relation from and generally medially along the respective lateral side 16 of the vehicle frame 14. It is preferred that the center drive wheel 36 includes a pneumatic tire (which is removed from the left side for clarity in FIGS. 4 and 6) to provide a smoother ride. However, those of ordinary skill in the art will appreciate that the center drive wheel tire 36 can be any known design without departing from the scope of the present invention.

Referring to FIGS. 4 through 6, each suspension assembly 22 includes a front wheel support arm 38, having first and second support-arm-ends 40A, 40B, that is pivotally attached to the respective lateral side 16 of the vehicle frame 14. The front wheel support arms 38 each have a support arm 40C and a support-arm-pivot-point 42 (best shown in FIGS. 5 and 6) located between first and second support-arm-ends 40A, 40B. Each support-arm-pivot-point 42 is pivotally attached to a respective lateral side 16 of the vehicle frame 14.

Referring to FIG. 6, when the PMV 10 is positioned on a level, horizontal surface 12, the front wheel support arm 38 preferably extends generally upwardly and forward from the support-arm-pivot-point 42. It is preferred that the front wheel support arm 38 also extends generally rearwardly from the support-arm-pivot-point 42 and includes a bent plate 46 which forms a rearmost portion of the front wheel support arm 38. While a preferred configuration of the front wheel support arm 38 and the main pivot arm 24 is shown in the drawings, those of ordinary skill in the art will appreciate that the configuration of the arms can be varied without departing from the scope of the present invention.

The first support-arm-end 40A is slideably engaged with the main pivot arm 24. It is preferred that a connector 44 is located on the first support-arm-end 40A and is slideably and pivotally engaged with a slot 52 in the second end 26B of the main pivot arm 24 the connector 44 is preferably a steel pin, with a steel roller bushing over it, that rides in the slot. However, it could be formed by a roller bearing or other movable connection. In FIG. 6, a second distance Y is defined between the support-arm-pivot-point 42 and the connector 44. The second distance Y is used below to describe the configuration of the suspension system 22.

Referring to FIGS. 1-3, the second support-arm-end 40B of the front wheel support arm 38 extends generally forwardly from the vehicle frame 14 to support a front caster wheel 48. The front caster wheel 48 has a front-wheel-axis-of-rotation 50.

Referring to FIGS. 4-6, the front wheel support arm 38 and the main pivot arm 24 form a compensation mechanism that allows generally vertical movement of the front and rear caster wheels 48, 32 and the center drive wheel 36 in a coordinated manner for each suspension assembly 22 so that the suspension system 21 compensates for irregularities in the surface 12 during transport thereover, with the front and rear caster wheels 48, 32, and the center drive wheel 36 all being urged into a surface engaging position. Those of ordinary skill in the art will appreciate that the vertical movement of the front and rear caster wheels 48, 32 includes generally upwardly arcuate movement and generally downwardly arcuate movement about the respective pivot points 42 and 30, respectively.

Referring to FIGS. 1-3, it is preferred that the front and rear caster wheels 48, 32 move together generally upwardly or generally downwardly relative to the vehicle frame 14 and that the center drive wheel 36 move generally vertically relative to the vehicle frame in a direction generally opposite to the front and rear caster wheels 32, 48. This results in a gentle tilting of the PMV 10 which maintains a more comfortable center of gravity position for a user, and provides high stability due to all of the wheels being engaged with the ground. This allows for relatively smooth traversing of obstacles.

For example, starting from a generally neutral position, such as when the PMV 10 is on a flat surface, as shown in FIG. 1, when the front caster wheel(s) 48 strike a door threshold or other perturbation, the front caster wheel(s) 48 moves upwardly rotating the front wheel support arm(s) 38 so that the first end(s) 40A moves downwardly. The connection(s) 44 at the first end(s) 40A of the front wheel support arm(s) 38 acts on the slot(s) 52 on the second end(s) 26B of the main arm(s) 24 which causes the center drive wheel(s) 36 to be urged downwardly while the rear caster wheel(s) 32 is urged upwardly. This is shown in FIG. 3, and results in a gentle backward angular adjustment of the PMV seat and the center of gravity of a person sitting in the PMV 10 to increase comfort while the PMV 10 goes over the threshold or other perturbation. As the center drive wheel(s) 36 climbs the threshold, the resulting upward perturbation forces the center drive wheel(s) 36 to be moved generally vertically upwardly relative to the front and rear caster wheel(s) 48, 32. This causes a direct downward motion of the rear caster(s) 32 due to the pivoting motion of the main arm(s) 24, and also causes the front wheel support arm(s) 38 to rotate in a direction which forces the front caster(s) 48 generally downwardly into a ground engaging position. After the rear caster(s) 32 climbs the curb or other perturbation, the center drive wheel(s) 36 and the front and rear casters 48, 32 return to the generally level position, as shown in FIG. 1.

Referring to FIGS. 3 and 3A, it is preferred that at least one of the front and rear caster wheels 48, 32 includes a preloading device 54 to prevent caster flutter and to compensate for minor dimensional manufacturing variances in the frame or suspension assemblies. It is preferred that the compensation device 54 is a compression spring 56 that creates a force pressing the associated caster wheel generally downwardly toward the surface 12. The spring 56 is preferably enclosed inside a vertical tube 58 located at the second end 40B of the front wheel support arm 38 to bias a wheel holder 60 generally downwardly. This creates a moderate frictional force between the spring 56 and the wheel holder 60 to prevent caster flutter or undesired caster rotation. Those of ordinary skill in the art will appreciate that other known compensation devices can be used without departing from the scope of the present invention. Alternatively, a compensation device that only provides resistance to rotation of the associated caster assembly out of alignment with a direction of motion of the PMV 10 may be provided.

As shown in FIG. 6, it is preferred that the front wheel support arm 38 be configured so that, when the PMV 10 is on a level horizontal surface, the connection between the first end 40A of the front wheel support arm 38 and the main pivot arm 24 and a point of engagement between the front wheel support arm 38 and the front caster assembly are further away from the surface 12 than the pivot point 42 between the front wheel support arm 38 and the vehicle frame 14. It is also preferred that the main pivot arm 24 is configured so that, when the PMV 10 is on a level horizontal surface 12, a point of engagement between the front wheel support arm 38 and the main pivot arm 24 (i.e., in the preferred embodiment, the connector 44) and a point of engagement between the main pivot arm 24 and the rear caster assembly are further away from the surface 12 than the pivot point 30. It is preferred that when the PMV 10 is on a level horizontal surface, that an axis of rotation 62 of the center drive wheel 36 is closer to the surface 12 than a point of engagement between the front wheel support arm 38 and the main pivot arm 24. It is also preferred that the axis of rotation 62 of the center drive wheel 36 is closer to the surface 12 than a point of engagement between the front wheel support arm 38 and the front caster assembly as well as being closer to the surface 12 than a point of engagement between the main pivot arm 24 and the rear caster assembly.

Referring to FIG. 5, it is preferred that a motor 20 is located on each main pivot arm 24. Preferably, the main pivot arm 24 provides a support on which the motor 20 and associated gearbox for the center drive wheel 36 is mounted. An electrical connection is provided between the motor 20 and the battery 18.

Referring specifically to FIG. 6, preferably the slot 52 in the main pivot arm 24 has first and second slot ends 64A, 64B. The slot 52 is preferably slideably engaged by the connector 44. A fourth distance $B_1$ is defined between the second slot end 64B and the main-arm-pivot-point 30. A fifth distance $B_2$ is defined between the first slot end 64A and the main-arm-pivot-point 30.

Preferably, the ratio of the third distance X to the second distance Y is between approximately one to one (1:1) and approximately one to three (1:3). It is more preferred that the ratio of the third distance X to the second distance Y is between approximately one to one point five (1:1.5) and one to two (1:2). It is most preferred that the ratio of the third distance X to the second distance Y is approximately one to one point seven five (1:1.75).

Preferably, the ratio of the distance Y to the average B of the distances $B_1$ and $B_2$ is between approximately one to two (1:2) and approximately 2 to 1 (2:1). It is more preferred that the ratio of the distance Y to the average B is approximately one to one (1:1).

Additionally, it is preferred that the ratio of the average B to the distance A is between approximately one to two (1:2) and approximately two to one (2:1). It is more preferred that the ratio of the average B to the first distance A is approximately one to one (1:1).

It is preferred that the ratio of the sum of the distances A and X to the sum of the distances Y and the average B is between approximately one to two (1:2) and approximately one to one (1:1). It is more preferred the ratio of the sum of the distances A and X to the sum of the distances Y and B is approximately one to one point two five (1:1.25).

Preferably, the ratio of the distance X to the distance A is between approximately two to one (2:1) and approximately one to two (1:2). It is more preferred that the ratio of the distance X to the distance A is between approximately one to one point six (1:1.6) and one to one point nine (1:1.9).

By varying the configuration and pivot points of the front wheel support arm 38 and the main pivot arm 24, the above ratios can be varied in order to change the ride characteristics of the PMV 10. For example, varying the ratio of the distance X to the distance A or varying the ratio of the distance Y to the distance B results in different ride characteristics for the PMV 10, such as providing a stiffer or softer response to bumps, or more or less tilt adjustment as a perturbation is traversed. For example, when the sum of the distances A and X is increased relative to the sum of distance Y and average B, the ride of the PMV 10 will be softer. Conversely, when the sum of the distances A and X is reduced relative to the sum of the distance Y and average B, the ride of the PMV 10 will be stiffer.

Figure 7:
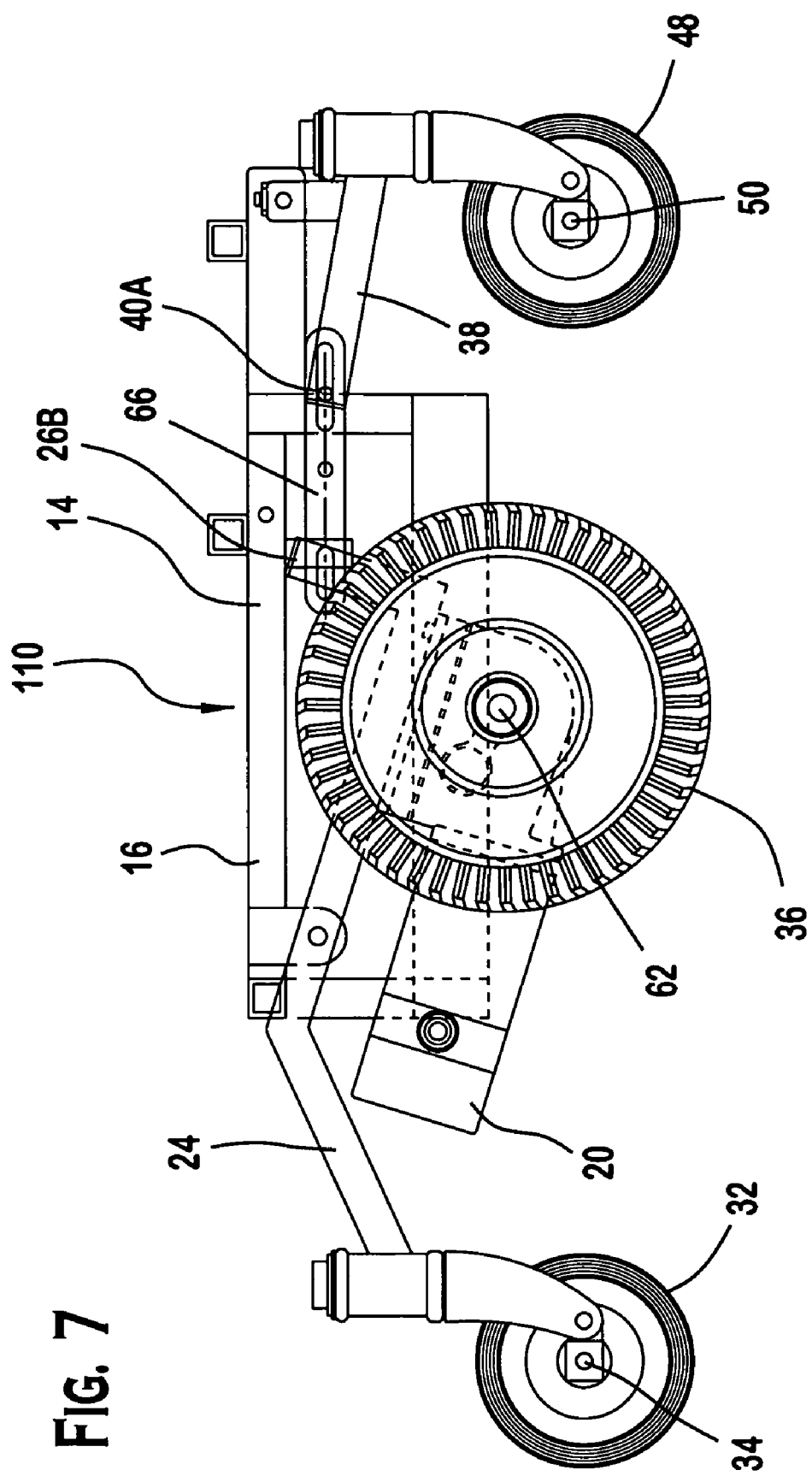
FIG. 7 is a side elevational view of a second preferred embodiment of a suspension system for a PMV according to the present invention that includes a connector link between the front wheel support arm and the main pivot arm.

Referring to FIG. 7, a second embodiment of the PMV 110 is shown. The PMV 110 is similar to the PMV 10 of the first embodiment, and like elements have been designated with the same reference numerals. In the second embodiment of the PMV 110, a connector link 66 is used to connect the first end 40A of the front wheel support arm 38 to the second end 26B of the main pivot arm 24. The connector link 66 is preferably pivotally and slideably connected to each of the main pivot arm 24 and the front wheel support arm 38, preferably using nylon bushings or roller bearings on the ends of the arms that travel in slots defined in the connector link 66.

While the caster wheels 48, 32 have been defined as being front or rear wheels, those of ordinary skill in the art will appreciate that either end of the PMV 10, 110 can serve as the front thereof. Accordingly, the recitation of first and second caster wheels in some of the claims further emphasizes that either side of the PMV shown in the drawings can be considered the front thereof. Additionally, the motor 20 can be mounted either on a rear or front portion of the PMV 10, 110 without departing from the present invention. While a powered PMV is the preferred application for the suspension system of the invention, the present invention does not require a powered center wheel.

Referring to FIGS. 1-6, one embodiment of the present invention operates as follows. When the PMV 10 encounters an upward protuberance in a surface 12, the front caster wheel 48 moves upwardly causing the front wheel support arm 38 to rotate about the support-arm-pivot-point 42 so that the first end 40A thereof moves downwardly. This forces the center drive wheel 36 generally downwardly while simultaneously urging the rear caster wheel 32 generally upwardly. This results in the center of gravity of a user seated on the PMV 10 rotating slightly backward allowing the user to maintain a secure, comfortable seated position while the PMV 10 traverses the protuberance. Similarly, when a cavity in the surface 12 is encountered, the front caster wheel 48 is pushed downwardly, driven in part by the weight of the PMV and user, causing the front wheel support arm 38 to rotate so that the first end 40A thereof moves upwardly, urging the center drive wheel 36 generally upwardly relative to the front caster wheel 48 so as to maintain a comfortable seated position while traversing the cavity.

It should also be realized that the two sides of the vehicle's suspension operate independently of one another, and as such, would allow one side's suspension to articulate upward while simultaneously allowing the other side's suspension to articulate downward, as if the vehicle were to traverse a bump on one side while simultaneously traversing a rut on the other side.

It will be recognized by those skilled in the art that changes may be made to the above described embodiments of the invention without departing from the broad inventive concept thereof. It is understood, therefore, that this invention is not limited to the particular embodiments disclosed, but is intended to cover all modifications which are within the spirit and scope of the invention as defined by the appended claims and/or shown in the attached drawings.

What is claimed is:

1. A personal mobility vehicle (PMV) comprising:
   a vehicle frame having spaced apart lateral sides;
   at least two suspension assemblies, one located on each of the lateral sides and further comprising:
      a main pivot arm having first and second main-arm-ends, an intermediate portion, and a first wheel connected to the first main-arm-end, the intermediate portion pivotally connected to a respective one of the lateral sides, with the first main-arm-end and first wheel extending in a first direction from the vehicle frame;
      a center drive wheel located on the second main-arm-end of the main pivot arm for generally vertical movement relative to the vehicle frame; and
      a wheel support arm having first and second support-arm-ends and a second wheel connected to the second support arm end, the wheel support arm pivotally connected to the respective one of the lateral sides, the first support-arm-end being slidably engaged with the main pivot arm, the second support-arm-end and the second wheel extending in a second direction, generally opposite the first direction, from the vehicle frame.

2. The PMV of claim 1, wherein the center drive wheel is positioned by the main pivot arm in a spaced apart relation from and generally medially along the one lateral side of the vehicle frame.

3. The PMV of claim 1, further comprising a drive motor for actuating the center drive wheel attached to the main pivot arm.

4. The PMV of claim 3, further comprising a battery mounted on the vehicle frame and electrically connected to the drive motor.

5. The PMV of claim 1, wherein a portion of the wheel support arm located between the first and second support-arm-ends is pivotally attached to the vehicle frame.

6. The PMV of claim 5, wherein the first support-arm-end of the wheel support arm is both slidably and pivotably engaged with a slot in the main pivot arm.

7. The PMV of claim 1, further comprising a first a caster assembly which comprises the first wheel and a second caster assembly which comprises the second wheel.

8. The PMV of claim 7, wherein at least one of the first and second caster assemblies includes a compensation device.

9. The PMV of claim 8, wherein the compensation device includes a spring that creates a frictional force to prevent rotation of the at least one of the first and second caster assemblies.

10. The PMV of claim 1, further comprising a first a caster assembly which comprises the first wheel and a second caster assembly which comprises the second wheel, and wherein the wheel support arm is configured so that, when the PMV is on a level horizontal surface, a point of engagement between the wheel support arm and the main pivot arm and a point of engagement between the wheel support arm and the second caster assembly is further away from the surface than a pivot point between the wheel support arm and the vehicle frame.

11. The PMV of claim 1, further comprising a first a caster assembly which comprises the first wheel and a second caster assembly which comprises the second wheel, and wherein the main pivot arm is configured so that, when the PMV is on a level horizontal surface, a point of engagement between the wheel support arm and the main pivot arm and a point of engagement between the main pivot arm and the first caster assembly are further away from the surface than a point of engagement between the main pivot arm and the vehicle frame.

12. The PMV of claim 1, further comprising a first a caster assembly which comprises the first wheel and a second caster assembly which comprises the second wheel, wherein when the PMV is on a level horizontal surface, an axis of rotation of the center drive wheel is closer to the surface than a point of engagement between the wheel support arm and the main pivot arm, than a point of engagement between the wheel support arm and the second caster assembly, and than a point of engagement between the main pivot arm and a first caster assembly.

13. The PMV of claim 1, wherein the suspension assemblies are configured so that the first and second wheels move together generally upwardly or generally downwardly relative to the vehicle frame, and the center drive wheel moves generally vertically relative to the vehicle frame in a direction generally opposite to the motion of the first and second wheels.

14. The PMV of claim 1, wherein the suspension assemblies allow generally vertical movement of the first and second wheels and the center drive wheel in a coordinated manner for each of the suspension assemblies is provided to compensate for irregularities in the surface during transport thereover, the first and second wheels and the center drive wheel all being urged into a surface engaging position.

15. A PMV comprising:
a vehicle frame having spaced apart lateral sides;
at least two suspension assemblies, one being disposed on each of the lateral sides and further comprising:
a main pivot arm having a main-arm-pivot-point intermediate first and second main-arm-ends, the main-arm-pivot-point being pivotally connected to a respective one of the lateral sides, the first main-arm-end extending generally rearwardly from the vehicle frame and being connected to a rear caster wheel having a rear-wheel-axis-of-rotation, a first distance being defined between the main-arm-pivot point and the rear-wheel-axis-of-rotation;
a center drive wheel located on the second main-arm-end of the main pivot arm for vertical movement relative to the vehicle frame;
a front wheel support arm having a support-arm-pivot-point intermediate first and second support-arm-ends, the support-arm-pivot-point being pivotally attached to the respective one of the lateral sides, a connector located on the first support-arm-end being slidably engaged with the main pivot arm, a second distance being defined between the support-arm-pivot-point and the connector, the second end of the front wheel support arm extending generally forwardly from the vehicle frame and being connected to a front caster wheel having a front-wheel-axis-of-rotation, a third distance being defined between the support-arm-pivot-point and the front-wheel-axis-of-rotation.

16. The PMV of claim 15, wherein the main pivot arm includes a slot having first and second slot ends, the slot being slidably engaged with the connector, a fourth distance being defined between the second slot end and the main-arm-pivot-point, a fifth distance being defined between the first slot end and the main-arm-pivot-point.

17. The PMV of claim 16 wherein the ratio of the sum of the first and third distances to the sum of the second distance and the average of the fourth and fifth distances is between approximately one to two (1:2) and approximately one to one (1:1).

18. The PMV of claim 17, wherein the ratio of the sum of the first and third distances to the sum of the second distance and the average of the fourth and fifth distances is between approximately one to one point one (1:1.1) and approximately one to one point four (1:1.4).

19. The PMV of claim 16, wherein the ratio of the second distance to the average of the fourth and fifth distances is between approximately one to two (1:2) and approximately two to one (2:1).

20. The PMV of claim 19, wherein the ratio of the second distance to the average of the fourth and fifth distances is approximately one to one (1:1).

21. The PMV of claim 15, wherein the ratio of the third distance to the second distance is between approximately one to one (1:1) and approximately one to three (1:3).

22. The PMV of claim 15, wherein the ratio of the third distance to the second distance is between approximately one to one point five (1:1.5) and approximately one to two (1:2).

23. The PMV of claim 15, wherein the ratio of the third distance to the first distance is between approximately two to one (2:1) and approximately one to two (1:2).

24. The PMV of claim 23, wherein the ratio of the third distance to the first distance is between approximately one to one point six (1:1.6) and approximately one to one point nine (1:1.9).

* * * * *